United States Patent

[11] 3,601,863

[72] Inventor Milton Dorsey
 16637 Kelsloan St., Van Nuys, Calif. 91406
[21] Appl. No. 826,597
[22] Filed May 21, 1969
[45] Patented Aug. 31, 1971

[54] CABLE BINDER
 5 Claims, 6 Drawing Figs.

[52] U.S. Cl. .................................................. 24/16 PB
[51] Int. Cl. .................................................. B65d 63/00
[50] Field of Search .......................................... 24/73, 81
 HS, 208–208.3, 265 SH, 265 BH, 265 H, 214, 73
 CC, 81 CC, 245.1, 16, 16 PB, 17, 17.1, 30.5 PB

[56] References Cited
 UNITED STATES PATENTS
 994,241  6/1911  Blaine .................. 24/17.1
 2,857,645 10/1958 Vogelsang .................. 24/245
 2,971,231  2/1961  Stoddart .................. 24/16 PB
 3,273,213  9/1966  Zurkowski .................. 24/73 CC
 3,502,396  3/1970  Greenberg .................. 351/157
 FOREIGN PATENTS
 997,278  9/1951  France .................. 24/17.1

*Primary Examiner*—Donald A. Griffin
*Attorney*—Roger A. Marrs

ABSTRACT: A cable binder is disclosed herein having an elongated, flexible band formed with a plurality of apertures arranged in a row along the longitudinal axis of the band. A rigid coupling means is adapted to be insertably disposed through selected ones of the apertures to retain the band about a single cable or a cable bundle. Other selected apertures may be employed to secure the banded cable or bundle to supporting structure.

PATENTED AUG 31 1971 3,601,863
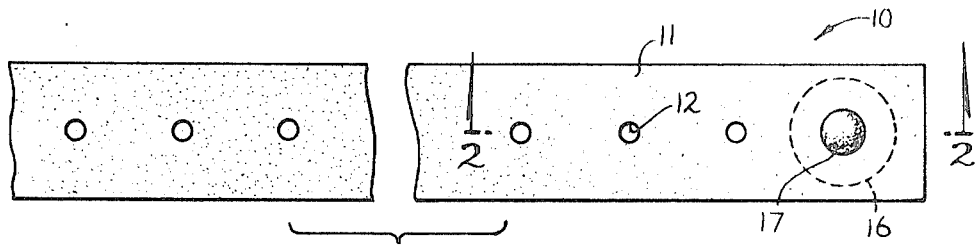
Fig.1
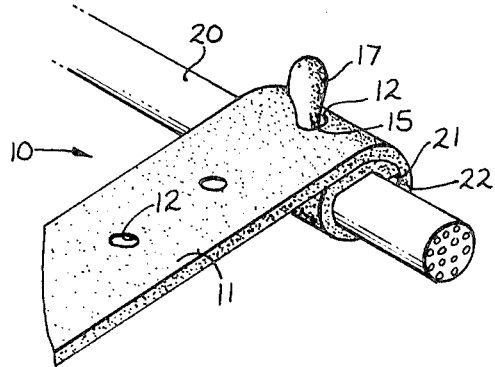
Fig.3
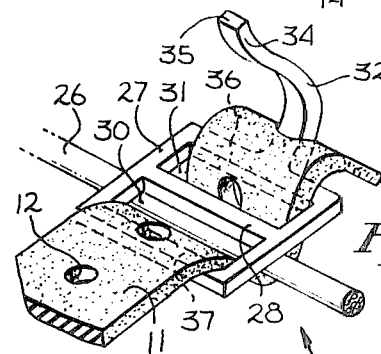
Fig.2
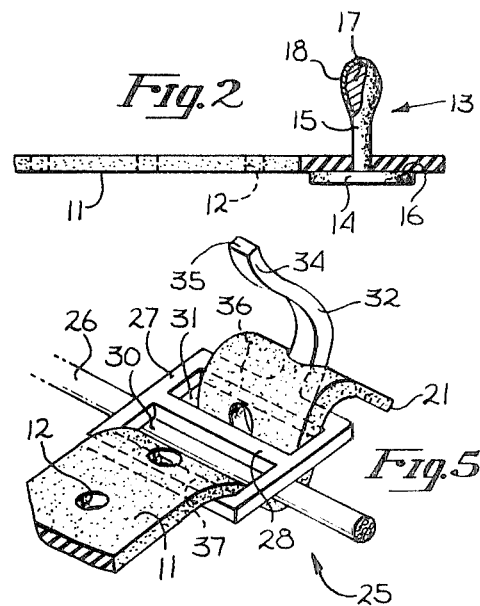
Fig.5
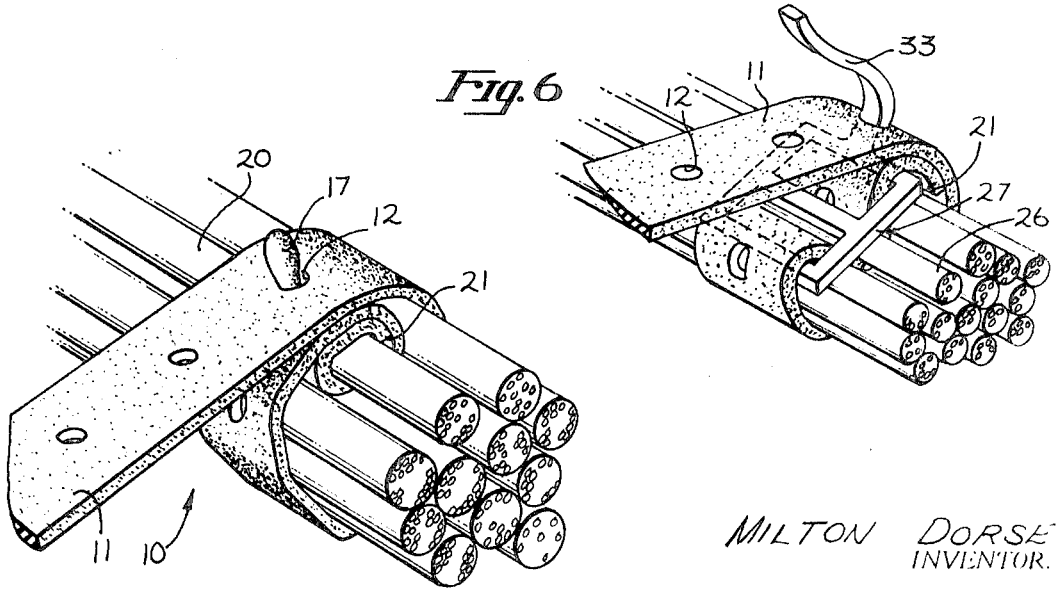
Fig.6
Fig.4
MILTON DORSEY
INVENTOR.
BY Roger A. Marrs

CABLE BINDER

BACKGROUND OF THE INVENTION

1. Field of the Invention

This invention relates to flexible band retainers which may be readily employed to mount and retain articles, such as wires, tubes, rods or the like, when such articles are to be secured as a unit to a supporting structure.

2. Description of the Prior Art

In the past, various attempts have been made to provide a retainer for cables and wire bundles which will secure the cable or bundles together as a unit and which may also be employed to secure the cable or bundle to a supporting structure. However, problems and difficulties have been encountered which stem from the fact that the retainer sometimes presents sharp edges which tend to sever the insulation of the cable so as to cause an electrical short. In other retainers, securement to the supporting structure must be made preparatory to securement of the retainer to the cable or wire bundle. Still other retainers require that the cable or wire bundle be inserted through a closed strap which results in a loose securement of the article being retained.

Therefore, a need has long existed to provide a cable binder or retainer which may be easily secured about the articles or elements to be supported without requiring excessive accuracy of location. The construction of some conventional retainers requires initial mounting on the supporting wall prior to securement about the article to be supported.

A retainer should have high retentive qualities in relation to the supporting structure as well as the supported article. The material of the retainer must provide characteristics for effectively insulating the article electrically, thermally, and mechanically from the supporting structure. Thus, the article mounted by means of the retainer is not likely to be electrically grounded through the retainer if it is of an electrical nature. Heat will not likely be transferred through the retainer either to or from the article supported and vibrations present in either the supporting article or the supporting structure should not be readily transmitted through the retainer. Positive locking features of the retainer for locking the retainer to the supporting structure as well as independently locking the retainer to the article being supported is a prime necessity.

Conventional retainers which present some of the above-mentioned problems are disclosed in U.S. Pat. Nos. 2,896,889; 2,971,231; and 3,059,359.

SUMMARY OF THE INVENTION

Accordingly, the above difficulties and problems encountered with conventional wire or cable retainers are obviated by the present invention which provides a length of resilient or elastic material having a plurality of holes extending throughout its length along the longitudinal axis thereof midway between the opposite edges of the material. Additionally, a coupling means, which in one form comprises a base having a rigid post or shank terminating in a rounded bead, is employed and may be insertably forced through selected registered or aligned ones of the apertures to secure a cable or wire bundle within a loop formed by the material as closed by the coupling means.

In another form of the invention, the coupling means may comprise a buckle including a rigid tong or hook which is insertably received through the selected aligned apertures of the elastic means.

The elastic material may take the form of a flexible band and the coupling means, either of the button type or of the hook type, may be normally attached at one end of the band to a cable and then the band stretchably wrapped for one turn around the cable or bundle. Because of the elastic character of the band, the fastening or coupling means can be attached under tension and so provide a secure means for holding the cable in a desired rigid bundle by itself, or for attaching the cables to some part of the equipment for convenient stowage by employing other selected apertures in the elastic material.

Therefore, it is among the primary objects of the present invention to provide a novel cable or wire retainer having the advantages of simplicity of manufacture, ease of handling and, when assembled with articles to be secured, provides a unitary construction.

Another object of the present invention is to provide a novel wire or cable retainer for securing or binding a plurality of cables with more than one turn of an elongated band or strap thereabout.

Another object of the present invention is to provide a novel cable retainer or binder that provides a quick release of secured cables without disassembly of parts which normally may result in cutting, damage or other physical alteration or modification of the retainer.

Still a further object of the present invention is to provide a novel cable binder for temporarily or permanently holding together an assortment of articles, such as hanks, coils or bundles of rope, wire, electrical cables, rods, tubing, doweling, or the like when not in use during storage.

A further object of the present invention is to provide a novel cable binder for securing the cables to supporting structure as an assembly and which avoids loss or misplacement when cables, rope or the like are not in use.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a plan view of the novel cable retainer or binder of the present invention illustrated preparatory for use in binding a cable or wire bundle;

FIG. 2 is a side elevational view, partly in section of the cable binder shown in FIG. 1 as taken in the direction of arrows 2—2 thereof;

FIG. 3 is a perspective view of the cable binder shown in a typical application for supporting a cable or as an initial step in assembly for securing a plurality of cables;

FIG. 4 is a perspective view similar to the view of FIG. 3 illustrating the cable binder in an application for binding and supporting a cable bundle;

FIG. 5 is a perspective view of another embodiment of the present invention; and FIG. 6 is a perspective view of the embodiment shown in FIG. 5 illustrated in a typical application for binding a cable bundle.

DESCRIPTION OF THE PREFERRED EMBODIMENT

Referring to FIG. 1, the novel cable binder or retainer of the present invention is indicated in the general direction of arrow 10 which includes, in one form of the invention, a longitudinally extending band or strap 11 which is provided with a plurality of holes or apertures 12 that are linearly spaced relative to each other in a row along the length of the band 11. The band 11 is composed of flexible and elastic material and is preferably fabricated from a suitable grade of rubber or of an equivalent rubberlike plastic composition. The desired elasticity is about midway between the well-known rubber band and a strip of leather; in other words, neither fully elastic nor nonelastic.

The cable fastener or binder 10 further includes a coupling means indicated in FIG. 2 by the arrow 13. The coupling means may take the form of a button or stud-type fastener having a circular base 14 formed with an upstanding shank 15 extending from the center thereof and normal to an annular base surface 16. The free end of shank 15 terminates in a rounded head or bead 17 so that the bead is of a greater diameter than the shank 15. Preferably, the entire fastener or stud 13 is covered with a suitable dielectric vinyl coating as indicated by numeral 18. The fastener 13 is rigid and stiff and is sufficiently strong under all conditions of use so that it will not deform, flex or distort. The cross section dimension of the head 17 is slightly greater than the diameter of the hole 12 so that the head 17 must be forcibly inserted into the hole by means of the strap material surrounding the hole yielding under the thrust of insertion.

In view of the foregoing, it can be seen that a two-piece cable retainer is provided including the flexible strap or band 11 and the rigid stud fastener 13. Initially, the stud 13 is pressed through a selected aperture so that its head 17 passes therethrough and the strap is slid downwardly on the shank 15 in seating abutment with the circular flange 16 of base 14.

As illustrated in FIG. 3, the strap 11 is wound around a cable 20 with the base 14 of the fastener resting against the exterior surface of the cable. The end of strap 11 terminates as indicated by numeral 21 and the length of strap is wrapped about the exterior surface of the cable as indicated by numeral 22 representing a single turn of the strap. The enlarged head or bead 17 of the stud fastener is pressed through registered apertures 12 as the strap overlays upon itself. Thus, a closed loop portion is formed substantially extending between the registered apertures that encircles the cable 20. Although the first and third apertures from the end of the strap are illustrated as being in registry so as to receive the shank or stud fastener 15, it is to be understood that any pair of apertures or more may be employed, if desired. Furthermore, since the composition of the band or strap 11 is substantially elastic, flexible and resilient, the alignment or registry of selected ones of the apertures may be made by stretching the band so as to ensure a tight strap loop about the cable. By this means, improved securement is assured between the strap and the cable.

Once the loop has been formed by the registry of selected apertures and the stud fastener engaged therethrough, a substantial length of strap extends from the cable securement and this extended length may be employed for connecting the retainer to a supporting structure or for carrying the cable. Securement to the supporting structure may be made by wrapping the extended length of strap therearound and fastening with a stud fastener in a similar fashion to that previously described. As an alternative, other fasteners or coupling means may be employed for securing the strap to the supporting structure. If desired, the cable may be handled or carried by the extended portion of the strap when it is not desired to secure the cable to supporting structure.

Referring now to FIG. 4, it can be seen that the cable retainer 10 of the present invention is illustrated in a typical application for binding and retaining a plurality of cable in the form of a bundle. In such an application, the stud fastener 13 and the strap 11 are initially secured to cable 20 as previous described, However, the strap is then wound about the entire cable bundle and stretched so as to register and align a third aperture 12 with the two previous apertures on shank 15. This latter aperture is then forced over bead 17 onto shank 15 in combination with the underlying layers of strap material. In essence, a double loop is now defined wherein the first loop encircles and is held onto cable 20 and a second loop is defined which encircles all of the cables in the bundle including cable 20. The remaining extension of strap 11 may be employed for carrying purposes or for securement to a supporting structure, if desired.

Referring now in detail to FIG. 5, another embodiment of the present invention is illustrated in the general direction of arrow 25 which is employed for securement to a cable 26. Retainer 25 includes strap 11 as previously described with respect to embodiment 10. However, the coupling means is modified to employ a buckle 27 having a crossbar 28 separating a pair of elongated openings 30 and 31. One end of the buckle includes an outwardly projecting and cantilevered hook 32 which is of a substantially S-shaped configuration in side elevation. In detail, the hook comprises an arcuate portion 33 having a concave curvature facing the buckle crossmember 28 and a second arcuate portion 34 having a reverse curvature which terminates in a flat tip 35. Hook 32 is integrally formed with one end of the buckle as indicated by numeral 36 and the other end of the buckle is defined by a member 37. The exterior surface of the buckle is coated with a suitable plastic material.

Initially, the strap 11 is secured to buckle 27 by inserting the tip 35 of hook 33 through a selected aperture 12 and then the strap is slid along the shank of the hook so as to reside on the arcuate section 33. The free end of strap 11 is then threaded through opening 31, under crossbar 28 and upwardly through opening 30 and then across an end member 37. As the portion of the strap passes under crossbar 28 between openings 31 and 30, the cable 26 is captured therebetween and pressed against the underside of the flat buckle. For securing a single cable, the extending portion of strap 11 from opening 30 may now be looped over the end of hook 35 so that a selected aperture in the strap may be passed onto the shank of the hook and urged down against the first portion of the strap engaged on the hook.

In FIG. 6, a cable is bundled by initially securing cable 26 to the buckle and by wrapping the extended portion of the strap 11 about the entire bundle so that a selected aperture therein can be slipped onto the hook 33. The extended portion of the band or strap will be retained on the hook since its detachment or disassembly therewith requires extensive manipulation or working of the band over the arcuate portion of the hook which is readily done manually but cannot be achieved otherwise.

In view of the foregoing, it can be seen that the novel cable retainer of the present invention provides an improved retainer for securing single or multiple cable bundles in a satisfactory manner. The device, of either embodiment, is simple to manufacture and may be readily employed for its intended purpose by unskilled workers. The cable or cable bundle is held together as a unit by means of the resilient or elastic character of the strap composition as the loops are formed about the cable or cable bundle.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A retainer for attaching and supporting an article to a supporting structure, the combination comprising:
    an elongated flexible band having a plurality of apertures uniformly spaced along its length in a row substantially midway between the opposite side edges thereof;
    coupling means having a flat base and a shank outwardly extending from said base;
    a loop portion of said band stretchably extending around said article in engageable contact therewith and being defined between insertable engagement of said shank with aligned and registered selected ones of said band apertures; and
    said coupling means comprises a buckle fastener having a central crossbar separating a pair of elongated openings and wherein said shank is fixed to one end of said buckle midway between its opposite ends.

2. The invention as defined in claim 1 wherein said shank comprises a hook having a first arcuate portion exposing its concave curvature to said openings and an integral second arcuate portion having a reverse curvature terminating in a flat aperture insertion tip.

3. The invention as defined in claim 2 wherein a portion of said band is threaded from said shank downwardly through one of said openings and upwardly beneath said crossbar through said other opening whereby said article is captured between said band portion and said crossbar.

4. The invention as defined in claim 3 wherein said article comprises a plurality of cables and one of said cables is captured by said band portion, and another portion of said band stretchably encircles and binds all of said cables as a unit.

5. The invention as defined in claim 4 wherein a third band portion extends away from said buckle fastener for attachment to said supporting structure.